(12) United States Patent
Weedermann et al.

(10) Patent No.: US 12,094,435 B2
(45) Date of Patent: Sep. 17, 2024

(54) SYSTEMS AND METHODS FOR MANAGING APPLICATION REFRESH RATES PRESENTED ON A DISPLAY

(71) Applicant: Vertiv IT Systems, Inc., Huntsville, AL (US)

(72) Inventors: Joerg Weedermann, Santa Clara, CA (US); Joseph Amirthasamy, Weston, FL (US)

(73) Assignee: Vertiv IT Systems, Inc., Huntsville, AL (US)

( * ) Notice: Subject to any disclaimer, the term of this patent is extended or adjusted under 35 U.S.C. 154(b) by 130 days.

(21) Appl. No.: 17/879,439

(22) Filed: Aug. 2, 2022

(65) Prior Publication Data
US 2023/0041190 A1 Feb. 9, 2023

Related U.S. Application Data

(60) Provisional application No. 63/229,055, filed on Aug. 3, 2021.

(51) Int. Cl.
*G09G 5/00* (2006.01)
(52) U.S. Cl.
CPC ......... *G09G 5/003* (2013.01); *G09G 2354/00* (2013.01)

(58) Field of Classification Search
None
See application file for complete search history.

(56) References Cited

U.S. PATENT DOCUMENTS

2012/0151360 A1* 6/2012 Molander ................. G06F 9/54
715/736

* cited by examiner

*Primary Examiner* — Frank S Chen
(74) *Attorney, Agent, or Firm* — Dickinson Wright PLLC

(57) ABSTRACT

Systems and methods for managing refresh rates of applications running on a display device are disclosed. A computing device is designed to monitor and slow/reduce refresh rates for some applications running on the display device, while also allowing other applications to run at a fast/increased refresh rate. Each application is associated with a target device (e.g., server). The computing device can regulate a continuous stream of data, allowing some applications to access the data, while limiting/preventing other applications from accessing the data. The applications with access to the data can run at the fast refresh rates, while the remaining applications update at the slow refresh rates. As a result, the applications running at the fast refresh rates allow a user viewing the display device to actively monitor the respective servers associated with the fast-running applications, while reducing network load based on the relatively slow-running applications.

20 Claims, 8 Drawing Sheets

SYSTEMS AND METHODS FOR MANAGING APPLICATION REFRESH RATES PRESENTED ON A DISPLAY

CROSS-REFERENCE TO RELATED APPLICATIONS

This patent application claims the benefit and priority to US Provisional Patent Application Ser. No. 63/229,055, filed Aug. 3, 2021, the entire disclosure of which is incorporated herein by reference.

FIELD

The following description relates to managing multiple applications running on a client display. In particular, the description relates to a computing device designed to alter the polling/sampling rates of multiple applications running on a client display, thereby allowing some applications to run at faster refresh rates than other applications.

BACKGROUND

Conventional keyboard/video/mouse ("KVM") redirection mechanisms over an Internet Protocol ("IP") network rely on differential screen changes on a display that manages multiple target devices. These screen changes are transmitted in a continuous stream of network packets. This transmission is done to all connected client computers that want to display this data, regardless whether the particular client computer user utilizes this data presented on a display, or whether the user in front of the client computer is interested in seeing the data. An individual client cannot decide to skip or bypass receiving network packets, due to the nature of these packets containing differential data. Hence, there exists a relationship to previously received packets. Therefore, in conventional KVM displays, the exact same continuous stream of data is transmitted to all connected clients, leading to a substantial amount of network traffic that is potentially unnecessary. This issue can be multiplied for each additional client display device added to the network. Additionally, the KVM display (or computer running the KVM display) is subject to additional CPU usage that can reduce the lifespan of the KVM display.

SUMMARY

According to some embodiments of the present disclosure, a computing device configured to manage visual information on a client display is described. The computing device may include a memory device that stores executable instructions for running applications on the client display. The computing device may further include a processor communicatively coupled to the memory device, the processor configured to carry out steps that include running, at a first refresh rate, a first application and a second application. The steps may further include receiving an instruction to select the first application. The steps may further include causing, based on the instruction, the first application to run at a second refresh rate different than the first refresh rate.

According to other embodiments of the present disclosure, a non-transitory computer readable storage medium is described. The non-transitory computer readable storage medium is configured to store instructions that, when executed by a processor included in a computing device, cause the computing device to manage visual information on a client display, by carrying out steps that include running, at a first refresh rate, a first application and a second application. The steps may further include receiving an instruction to select the first application. The steps may further include causing, based on the instruction, the first application to run at a second refresh rate different than the first refresh rate.

According to other embodiments of the present disclosure, a method for managing visual information on a client display is described. The method may be performed by a computing a device that includes a processor. The method may include running, at a first refresh rate, a first application and a second application. The method may further include receiving an instruction to select the first application. The method may include causing, based on the instruction, the first application to run at a second refresh rate different than the first refresh rate.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
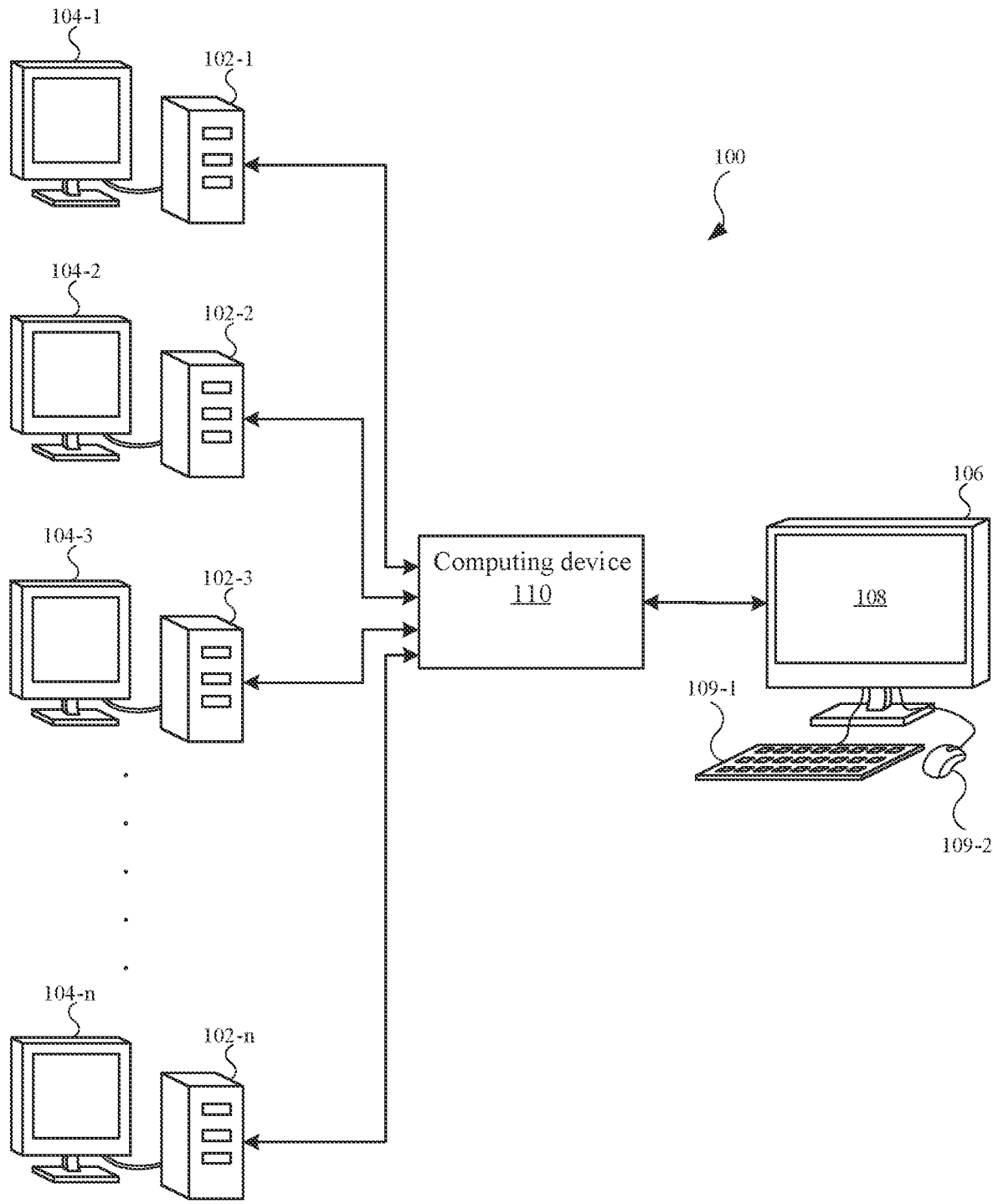
FIG. 1 illustrates a system diagram of multiple KVM devices in communication with a computing device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting, such that other embodiments may be used, and changes may be made, without departing from the spirit and scope of the described embodiments.

The following disclosure relates to a computing device that alters a continuous stream of data for use on a client display device. For example, one or more target devices (e.g., servers) provide a continuous data stream to the computing device, which is then sent to the client display device. In order to view the data stream from each server, the client display device represents each server as an application or window (e.g., web browser or some other network application) on a display screen of the client display device. In this regard, the client display device can run an application for each server, and mimic a miniature version of a display (connected to an individual server) as a window. Accordingly, for n servers, the client display device can run n applications at once, presenting the n applications as visual information (e.g., video/motion images, still images, and/or textual information) used to monitor the n servers. Based on various activity levels and real-time use among the servers, the client display device receives and presents visual information in the form of differential changes on the respective applications. In other words, one or more applications may update/change differently from the remaining applications based on differential activity levels of the individual servers. However, using the computing device as an intermediary hardware device between the servers and the client display device, the client display device can stop receiving the continuous data stream of differential changes for some applications, and continue to receive the data stream for some selected applications.

The computing device may include a keyboard/video/mouse ("KVM") appliance. When video is compressed within the KVM appliance using a certain type of compression engine, it must be decompressed after being received by the user's browser using the same type of decompression engine. There currently are a number of different video compression protocols being used by various manufacturers. For example, Dambrackas Video Compression ("DVC") or Run Length Encoding ("RLE"), may be utilized to transmit a video signal. Other well-known compression schemes are JPEG and PNG. However, JPEG and PNG are generally utilized for still images because of the bandwidth requirements when compared to specialized video compression engines. It will be appreciated by those skilled in this art that various other compression protocols exist as well. In a data center, for example, one video server may serve up video content encoded with DVC while another video server uses RLE to encode the video file content that it serves up.

As an example, when multiple applications are running on the client display device, the computing device can reduce the refresh rate (also referred to as the polling or sampling rate), measured in Hertz ("Hz") or frames per second ("fps"), of the applications to a rate below the specification of the client display device (as well as below the refresh rate specification of the application). Moreover, when the computing device detects that a threshold refresh rate is required, then the computing device can request that the video be sent using another compression engine. For example, when a requested refresh rate requires an update on the order of several seconds, a still image compression technique can be utilized. When at least one application is selected, the computing device allows the selected application(s) to run at a faster refresh rate than the remaining applications. In this regard, it may be desirable to monitor a particular server for various reasons. The selected application may represent a particular server of interest to a user viewing the client display device. Accordingly, in order to monitor the server(s) in their intended manner (i.e., in real time and at or near the higher possible refresh rate), the selected application(s), each associated with a particular server, is allowed to receive the continuous data stream and run at the higher refresh rate on the client display device. Conversely, the non-selected application(s), being updated at a slower refresh rate, represents a server (or servers) of less interest to the user. The non-selected application(s) can be represented by an image, including a compressed image file that is updated based on the (relatively) slow refresh rate. Alternatively, an application may be deemed "non-selected" when minimized on the client display screen, as the application is generally not visible on the client display screen. By reducing the refresh rate for several applications, or even switching those applications to a still image based compression scheme, and increasing the refresh rate for a selected number of applications, the overall network load can be substantially reduced. As a result, the reduced network load reduces the load of certain hardware components (e.g., CPU, GPU) of the computing system running the client display device, thereby increasing the longevity of the computing system.

In some embodiments, the computing device monitors network bandwidth from one or more targets. When the network bandwidth falls below a threshold network bandwidth, the computing device can act as a switch to turn off live video data to respective web browsers running on one or more client devices. Further, the computing device can provide still images in place of the live video data, and update periodically. Conversely, the computing device can turn on live video data to one or more client electronic devices at or above the threshold network bandwidth. Alternatively, or in combination, the computing device can receive an instruction (e.g., from one or more client electronic devices) to limit or prevent the continuous data stream. For example, when multiple applications are running on the client display device, the user can select which application(s) to monitor, and the selection provides an instruction to the computing device, causing the computing device to increase the refresh rate of the selected application(s). Also, in some embodiments, the computing device can initially switch off live video streams to all applications running on the respective client electronic devices, and subsequently switch on the selected applications.

The need for such a computing device arises from a large data center management situation in which a system administrator (i.e., user) might be interested in observing the content of a large number of remote targets (e.g., servers) at one time, but is actively managing and operating a particular target system, and therefore inefficiently using network load and client computer's CPU load due to a fast refresh rate of client display screens.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 illustrates a diagram of a keyboard/video/mouse ("KVM") system 100 of multiple target devices (e.g., servers) in communication with a computing device, in accordance with some described embodiments. As shown, the system 100 includes multiple servers, represented as a server 102-1, a server 102-2, a server 102-3, and a server 102-n, where n is an integer. The servers 102-1, 102-2, 102-3, through 102-n are designed to carry out various services to client devices, such as storing, sending, and receiving data (as non-limiting data). Although not shown, the servers 102-1, 102-2, 102-3, through 102-n can be connected to a network accessible to multiple client devices. The system 100 includes a display device 104-1, a display device 104-2, a display device 104-3, a display device 104-n connected (e.g., communicatively coupled) to the servers 102-1, 102-2, 102-3, through 102-n, respectively. The display devices 104-1, 104-2, 104-3, through 104-n can run an application (e.g., software application) on a respective display screen (shown, not labeled) to monitor the servers 102-1, 102-2, 102-3, through 102-n, respectively.

The system 100 further includes a display device 106 (e.g., client display device, or client electronic device). The display device 106 can be part of a computing system (e.g., desktop device or laptop device, combination computing system and display). While a particular device is shown, the display device 106 may include any number of devices, including multiple devices, such as a workstation PC, a tablet computing device, a smartphone, and a laptop computing device, as non-limiting examples. The display device 106 includes a display screen 108 (e.g., monitor) designed to present visual information, in the form of motion/video images, still images, and/or textual information, running on one or more software applications (e.g., web browser or other installed application). As shown, an input device 109-1 (e.g., keyboard) and an input device 109-2 (e.g., mouse) are connected to the display device 106, thereby allowing a user to interact with the display device 106, thus altering the visual information. The visual information represented on the display devices 104-1, 104-2, 104-3, through 104-n can be viewed, or at least partially viewed, on the display device 106. In this regard, an application (e.g., web browser) representing each server can be minimized to fit the display screen 108.

The system 100 further includes a computing device 110. The computing device 110 is connected to the servers 102-1, 102-2, 102-3, through 102-n, the display devices 104-1, 104-2, 104-3, through 104-n, and the display device 106. In some embodiments, the computing device 110 is integrated into the display device 106 (or the computing system running the display device 106). In the embodiment shown in FIG. 1, the computing device 110 is a standalone KVM appliance used as a data management system.

While running, the servers 102-1, 102-2, 102-3, through 102-n may provide data, including a continuous data stream, to the display device 106. Additionally, the display device 106 can run n applications, with each application associated with a respective server, to monitor the data, and present the data on the display screen 108. Accordingly, the display device 106 represents a single device used to monitor the activity of n servers. The continuous data stream can represent significant data and a relatively high network flow, which can slow down the run speed of the display device 106 and reduce the overall network bandwidth available to other devices. Additionally, the hardware components of the display device 106 (or the computing system running the display device 106) must allocate a significant amount of processing to updating the applications, even when some applications are not in use, are of relatively less importance, or are minimally used. However, computing device 110, used as an intermediary device to receive the continuous data stream and subsequently distribute the data stream to the display device 106, is designed to reduce or prevent the continuous data stream to the display device 106, with the exception of one or more selected applications. This allows the selected applications to run at faster refresh rates than other non-selected applications. As a result, the network flow to the display device 106 is reduced. This will be shown and described below.

Figure 2:
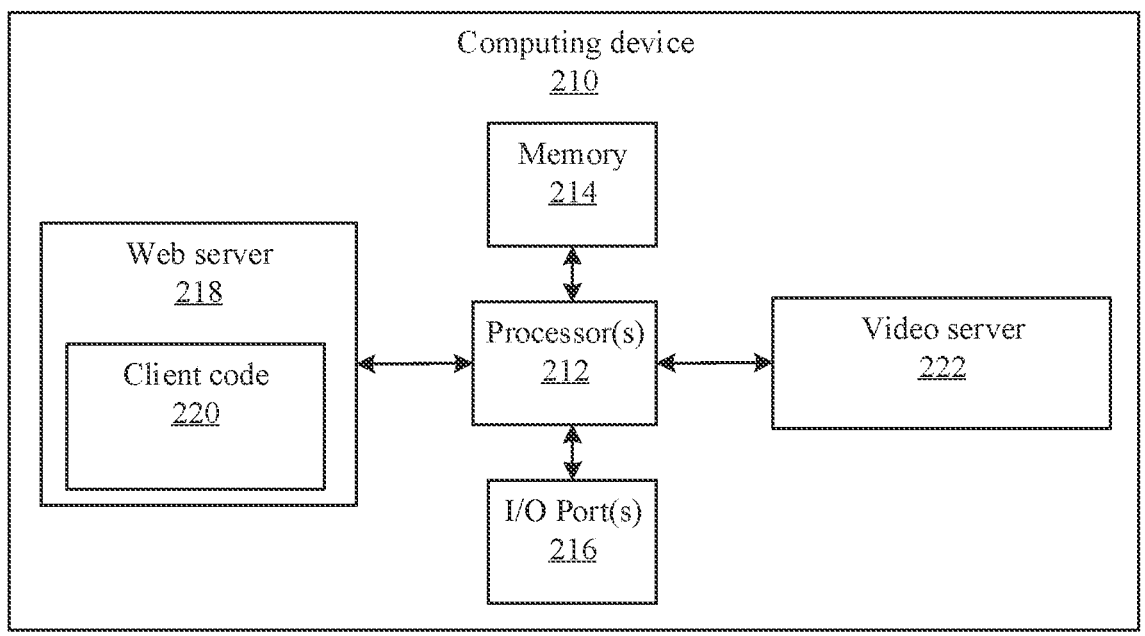
FIG. 2 illustrates a block diagram of a computing device, in accordance with some described embodiments.

FIG. 2 illustrates a block diagram of a computing device 210, in accordance with some described embodiments. As shown, the computing device 210 includes one or more processors 212. The one or more processors 212 are coupled to memory 214, representing one or more memory circuits that store algorithms and other executable functions. The one or more processors 212 are designed to send and receive information to a computing device (e.g., display device 106 and servers 102-1, 102-2, 102-3, through 102-n, both shown in FIG. 1) via one or more input-output ("I/O") ports 216. The one or more I/O ports 216 represent one or more physical connection points to the device 210. Using the one or more I/O ports 216, the computing device 210 can communicate with a wide area network ("WAN"), for example the Internet. Different types of client computing devices such as, without limitation, a workstation PC, a tablet computing device, a smartphone, and a laptop computing device may be in communication with the computing device 210 over the WAN, and each of the respective client electronic devices may be running an application (e.g., web browser) thereon.

The computing device 210 may include a web server 218 and a video server 222 separate from the web server 218. The web server 218 may store client code 220, including HTML5 client code, which may form an HTML page with JavaScript code that may be served up to any of the applications on the display device 106 (in FIG. 1) or another described client electronic device, when the web browser makes a request for content stored on any of servers 102-1, 102-2, 102-3 through 102-n. The video server 222 may incorporate multiple different video compression schemes to handle compressing video content being requested by any of the applications running on the client electronic devices. As an example, the video server 222 may have DVC, JPEG, PNG and RLE compression engines capable of compressing video content. The web server 218 may include HTML5 client code that may be served up to any of the applications running on the client electronic devices that makes a request for content from any of the servers 102-1, 102-2, 102-3, through 102-n.

Additionally, the video server 222 can monitor network bandwidth from the servers 102-1, 102-2, 102-3, through 102-n, and determine which server(s) are above or below a threshold network bandwidth, and alter the refresh rates, based upon the determined network bandwidth, of applications running on a client display device. Using the web server 218, the video server 222 can provide video or image data to the client electronic devices. For example, the video sever 222 can compress video streams below a network bandwidth, and compress the video data to run/update at a relatively slow refresh rate (e.g., 0.10 to 0.50 Hz or fps). The compressed video data can be represented as an image that is updated periodically. At the same time, the video sever 222 can run live video streams at or above the network bandwidth, allowing live video to run/update at a relatively fast refresh rate (e.g., 30 to 60 Hz or fps, or higher depend on the display specifications). The web server 218 can communicate the respective video data (e.g., compressed or live) to the appropriate client electronic devices. In addition, other factors may be used to determine refresh rates for an application running on a client electronic device. For example, a relatively slow refresh can be implemented when the application is either not in focus (i.e., a user did not select the application to be in the foreground and active on the display screen of the client display device), or the application is minimized on the client display device and is generally not even visible). At the same, a relatively fast refresh rate can be implemented when the application is either in focus or selected by a user.

Using the web server 218 and the video server 222, the computing device 210 can be used as a management system to display a matrix of several small windows, or rectangles, fit on a display screen of the client display device, with each rectangle showing video data of an individual video target (e.g., individual display connected to a server) to be managed. Each window may define an application, such as a network browser. Also, each window may update its respective screen content at the same refresh rate (e.g., 0.1 to 0.5 Hz or fps). If a situation of interest is observed by a user watching the display screen presenting the windows, the user can select or maximize the window (presenting the situation of interest) causing the window to update at a full refresh rate, presenting a live experience to the user. For example, the refresh rate can be the same or similar to the exemplary fast refresh rate described above.

Figure 3A:
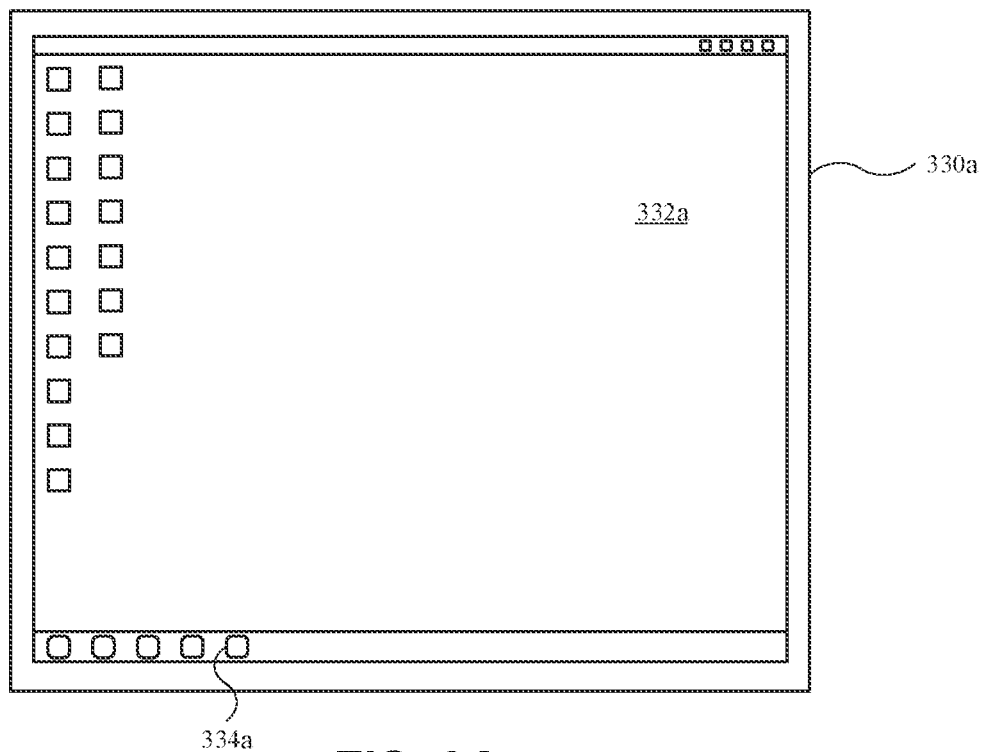
FIGS. 3A-3D illustrate displays with exemplary visual information presented on the displays, in accordance with some described embodiments.
Figure 3B:
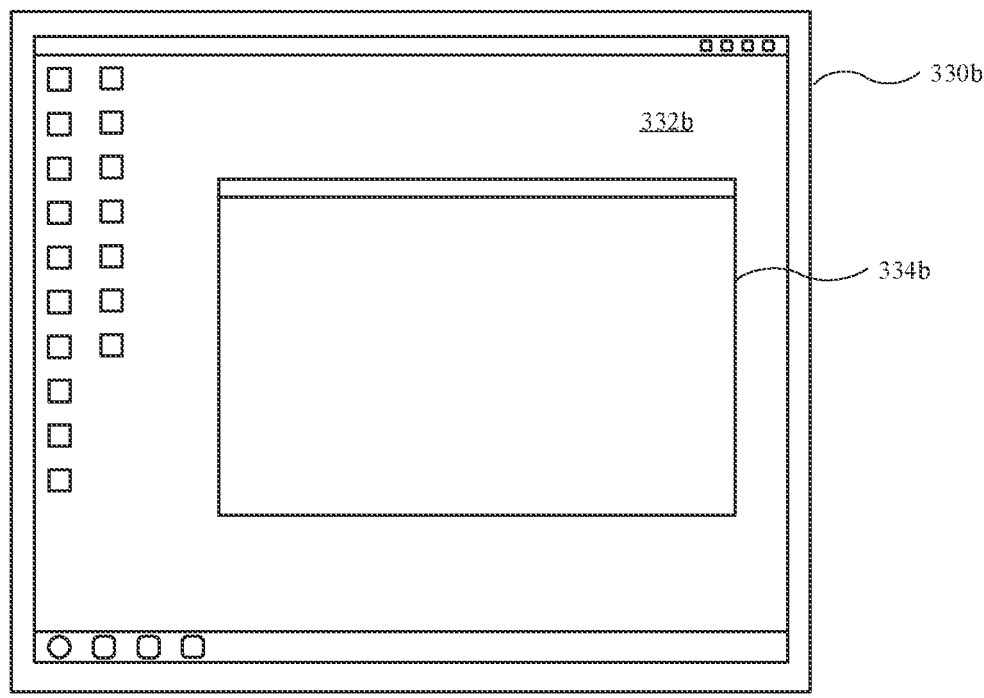

FIGS. 3A-3D illustrate displays with exemplary visual information presented on the displays, in accordance with some described embodiments. The examples show different displays monitoring information received from a target device (e.g., server) and describe an associated refresh rates. FIG. 3A shows a display 330a with a display screen 332a and an application 334a represented by an icon at the bottom of the display screen 332a. The icon represents the application 334a minimized on the display screen 332a, and accordingly the application 334a is generally not viewable to a user in front of the display screen 332a. FIG. 3B shows a display 330b with a display screen 332b and an application 334b presented on the display screen 332b. However, the application 334b is generally static and providing minimal information related to a server. The display screens 332a and 332b shown in FIGS. 3A and 3B, respectively, are examples of a display presenting relatively low activity levels from a server. Accordingly, a computing device may reduce the refresh rate of a window or application that shows the visual information of the screens 332a and 332b on a client display device.

Figure 3C:
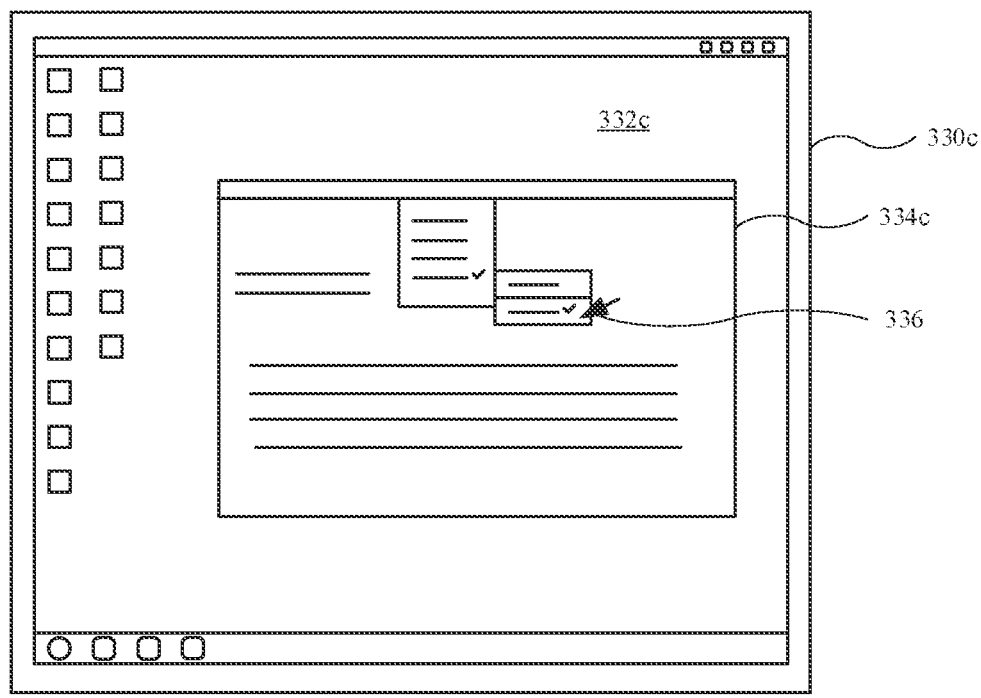
Figure 3D:
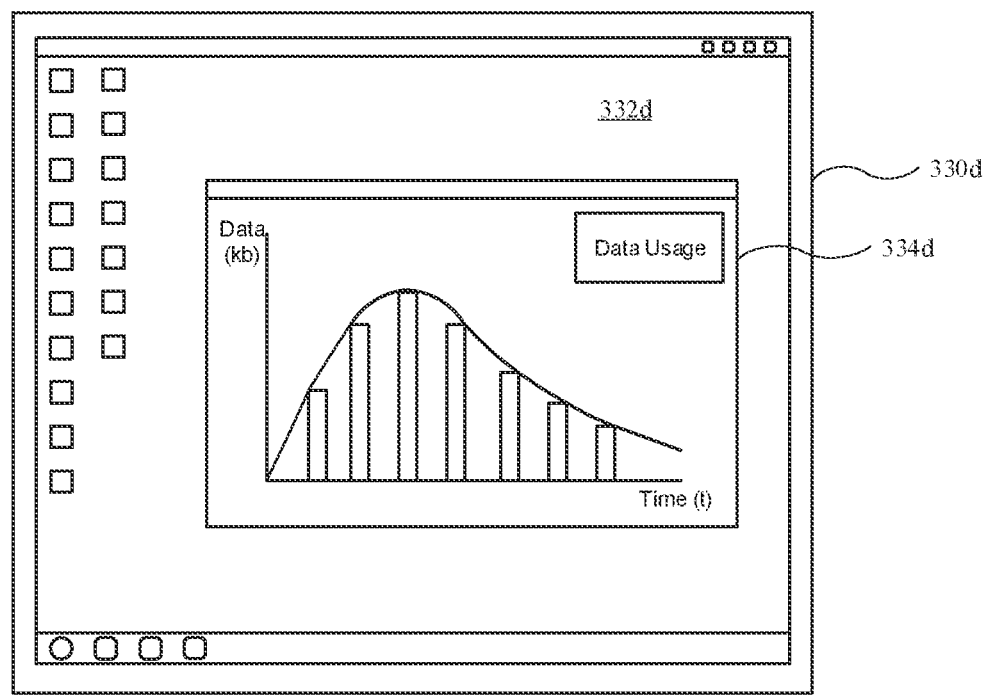

FIG. 3C shows a display 330c with a display screen 332c and an application 334c presented on the display screen 332c. As shown, a cursor 336 (being moved through a KVM device by a user of the display 330c) is hovering over the application 334c, causing an update (e.g., on or more drop-down menus) to occur. Accordingly, the user is interacting with the application 334c related to the server in order to, for example, review different parameters of the server. FIG. 3D shows a display 330d with a display screen 332d and an application 334d presented on the display screen 332d. As shown, the application 334d provides data and statistics related to the server. The data and statistics may be actively updated based on the server running. The display screens 332c and 332d shown in FIGS. 3C and 3D, respectively, are examples of a display presenting relatively high activity levels from a server. Accordingly, a computing device may increase the refresh rate of a window or application that shows the visual information of the screens 332c and 332d on a client display device, as the display screens 332c and 332d are of particular interest due to changing/updating information.

Figure 4:
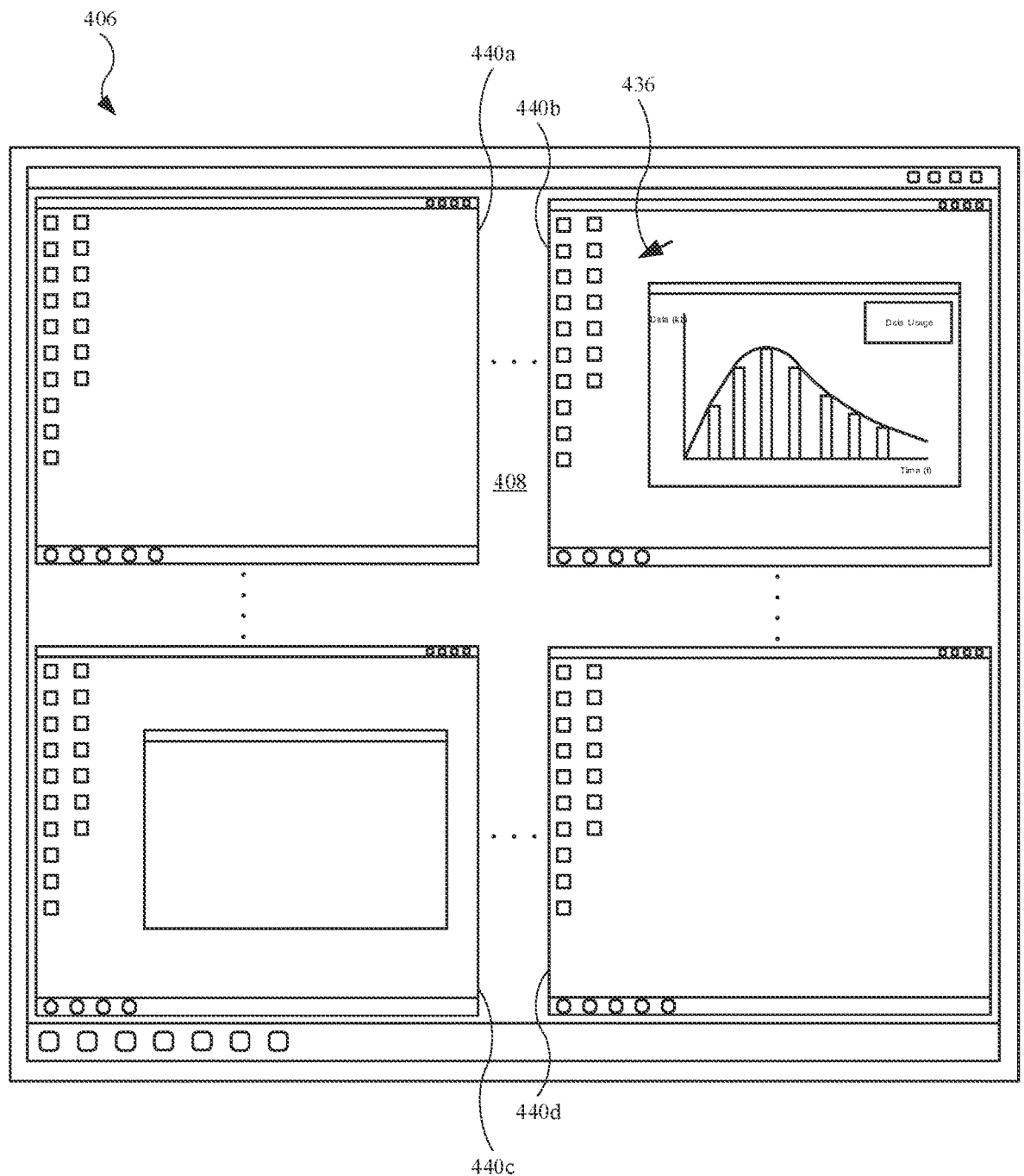
FIG. 4 illustrates a display device presenting visual information received from multiple displays, in accordance with some described embodiments.

FIG. 4 illustrates a display device 406 presenting visual information received from multiple displays, in accordance with some described embodiments. The display device 406 may function similar to the display device 106 (shown in FIG. 1). Also, the display device 406 can be in communication with a computing system (e.g., computing device 110 and computing device 210, shown in FIGS. 1 and 2, respectively). Accordingly, the display screen 408 can present windows and further, alter the windows to show information at different refresh rates.

As shown, the display device 406 includes a display screen 408 presenting multiple windows in the form of visual information. For example, the display screen 408 is presenting a window 440a, a window 440b, a window 440c, and a window 440d. The number of windows is exemplary and may increase or decrease. Further, the number of windows may correspond to the number of servers in communication with the display device 406. In some embodiments, each of the windows 440a, 440b, 440c, and 440d represents an application (e.g., web browser) showing a virtual display connected to a respective server. In this manner, each of the windows 440a, 440b, 440c, and 440d are in communication with their respective server, and provide information from a data stream of information provided by the server and received by the display device 406 via a computing device.

Prior to any manipulation by a computing device, each of the windows 440a, 440b, 440c, and 440d can present information from their respective servers in real-time using a refresh rate allowed by the specification of the display device 406. However, using a computing device described herein, the refresh rate of each of the windows 440a, 440b, 440c, and 440d can be reduced to a relatively slow refresh rate (e.g., 0.1 to 0.5 Hz or fps). Subsequently, however, based on user preference, the refresh rate of at least one of the windows 440a, 440b, 440c, and 440d can be increased. For example, when a cursor 436, presented on the display screen 408, is used to select the window 440b, the selection can be provided as an instruction to a computing device to increase the refresh rate of the window 440b (e.g., to 30 to 60 Hz or fps) relative to the refresh rate of the windows 440a, 440c, and 440d. Further, when the cursor 436 is used to later de-select the window 440b and/or select another window(s), an additional instruction to the computing device can reduce the refresh rate of the window 440b down to within the prior (slower) range of values, and increase the refresh of the other window(s) to the faster range of values. Alternatively, the mere hovering of the cursor 436 over the window 440b without an actual selection (e.g., mouse click) can also trigger an instruction to a computing device to increase the refresh rate of the window 440b, and the removal of the hovering of the cursor 436 over the window 440b can trigger a subsequent instruction to the computing device to decrease the refresh rate of the window 440b.

Also, the windows 440a and 440d represent the display screen 332a (shown in FIG. 3A), and the window 440c represents the display screen 332b (shown in FIG. 3B). Accordingly the windows 440a, 440c, and 440d are associated with low or no activity of their respective servers. Meanwhile, the window 440b represents the display screen 332d (shown in FIG. 3D), and accordingly the window 440b is associated with a relatively high activity of the associated server. In some embodiments, a computing device analyzes a continuous data stream to determine which server(s) are relatively active and inactive, and uses the relative activity levels as an instruction to increase the refresh rate(s) of a window(s) associated with the relatively active server(s) and reduce the refresh rate(s) of a window(s) associated with the relatively inactive server(s). In other words, the computing device can refresh rates based on data stream analysis.

Figure 5:
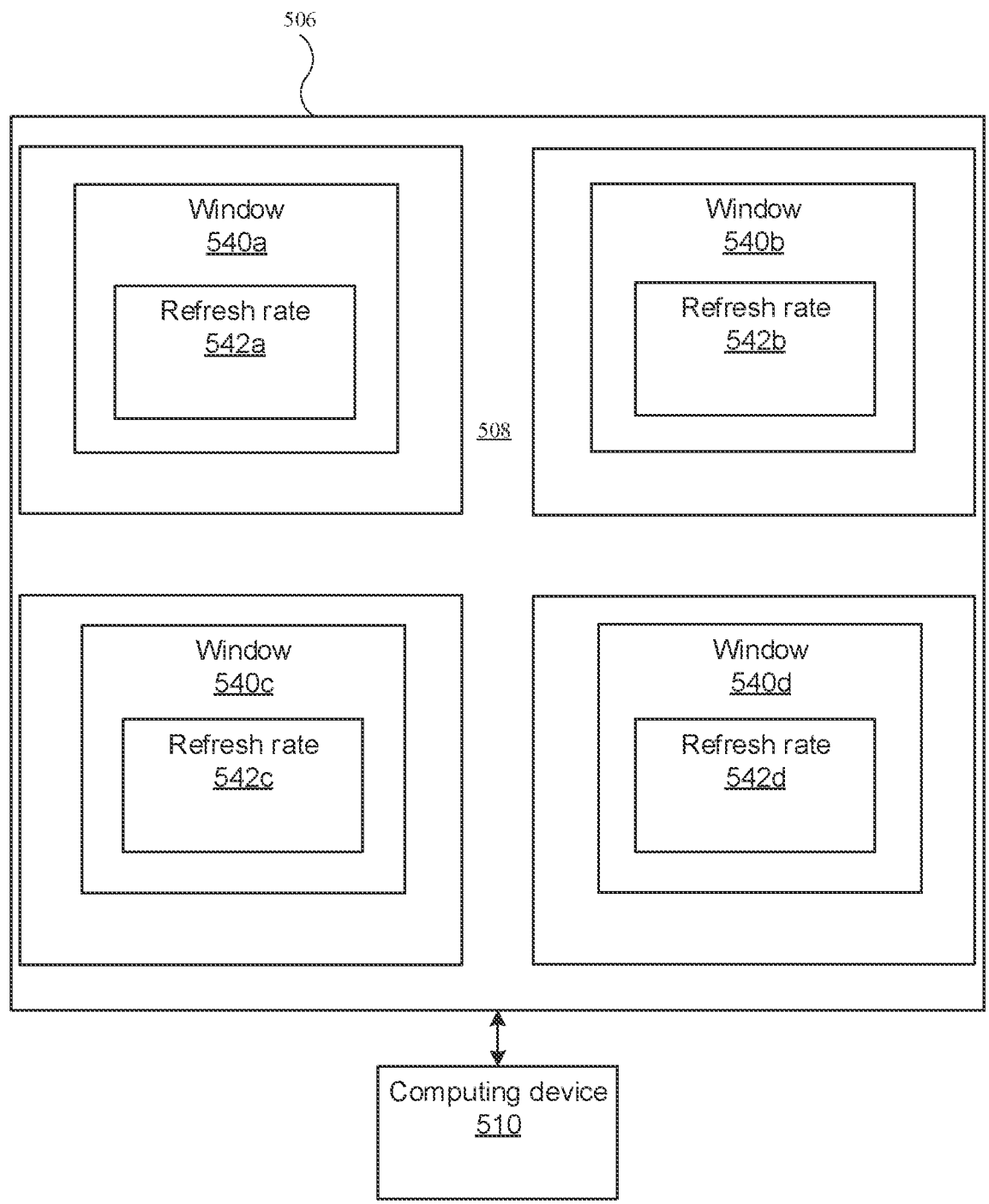
FIG. 5 illustrates a schematic diagram of a display device, showing several windows and associated refresh rates, in accordance with some described embodiments.

FIG. 5 illustrates a schematic diagram of a display device 506 and a computing device 510, showing several windows and associated refresh rates, in accordance with some described embodiments. As shown, the display device 506 includes a display screen 508 presenting a window 540a, a window 540b, a window 540c, and a window 540d. Further, using the computing device 510, a refresh rate 542a, a refresh rate 542b, a refresh 542c, and a refresh rate 542d are shown with the windows 540a, 540b, 540c, and 540d, respectively. The refresh rates 542a, 542b, 542c, and 542d can each vary based upon the user selection of the windows 540a, 540b, 540c, and 540d, respectively.

Figure 6:
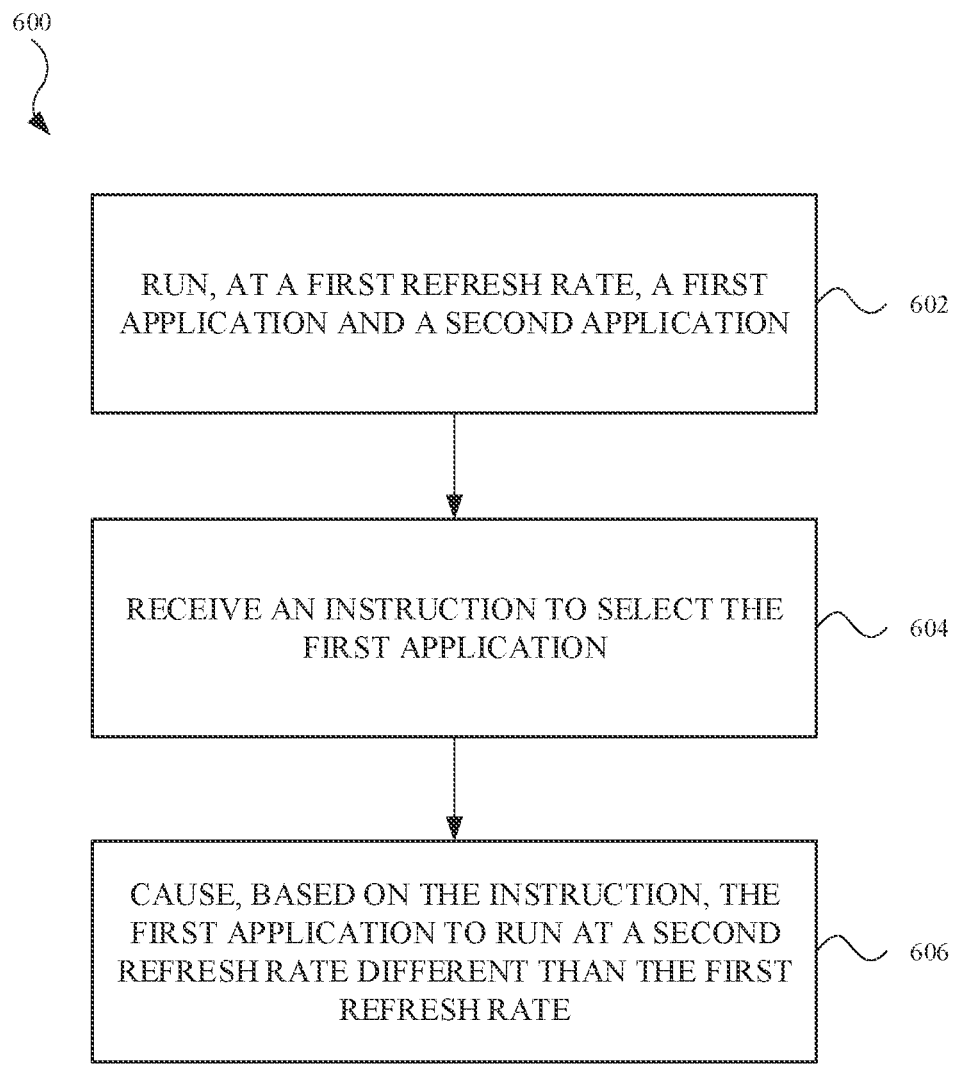
FIG. 6 illustrates a flowchart showing a process for managing visual information on a client display, in accordance with some described embodiments.

FIG. 6 illustrates a flowchart showing a process 600 for managing visual information on a client display, in accordance with some described embodiments. The steps of the flowchart 600 may be performed by a computing device, such as a computing device designed to alter refresh rates of windows presented on a display device.

At step 602, a first application and a second application are each run at a first refresh rate. The first and second applications may each include a window defined by a web browser or some other application. Also, the first and second applications may be presented on a client display device. In some embodiments, the first and second refresh rates may each represent a relatively slow refresh rate, i.e., a refresh rate slower than the specified refresh rate of the client display device. This may be controlled by a computing device described herein.

At step 604, an instruction is received to select the first application. The instruction may include an on demand instruction provided by a user of a KVM device interacting with a client display device. Alternatively, the instruction may derive from the computing device monitoring a continuous data stream from several servers, and determining relative activity levels of the servers.

At step 606, the first application is caused to run, based on the instruction, at a second refresh rate different than the first refresh rate. As an example, the first application (i.e., selected application) can increase from the relatively slow refresh rate to a relatively faster refresh rate, while the second application remains at the relatively slower refresh rate.

Figure 7:
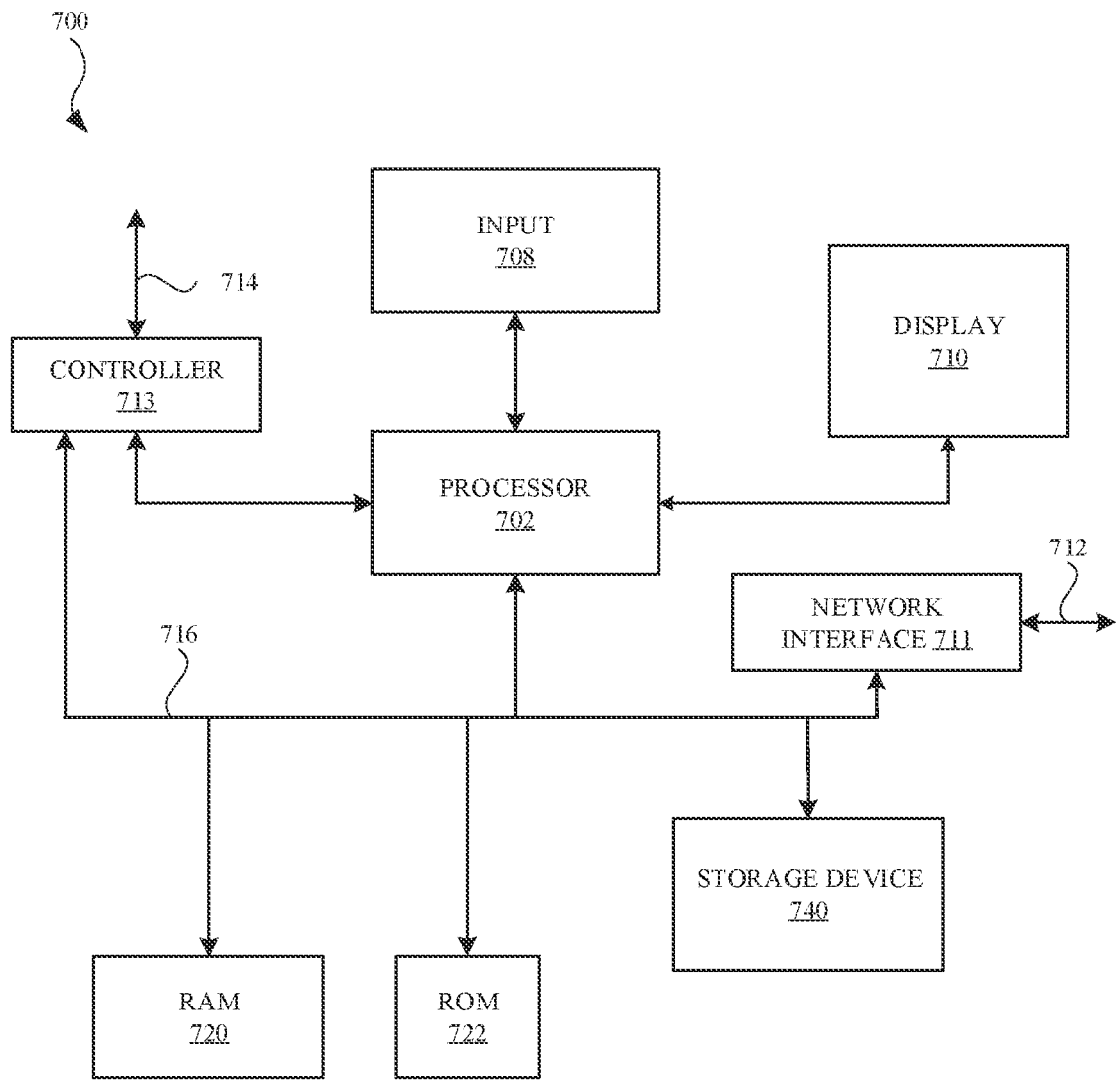
FIG. 7 illustrates a detailed view of a computing device that can be used to implement the various apparatus.

FIG. 7 illustrates a detailed view of computing device 700 that can be used to implement the various apparatus and/or methods described herein, in accordance with some described embodiments. In particular, the detailed view illustrates various components that can be included in the computing devices illustrated in FIGS. 1 and 2 and/or described herein. For example, a computing device described herein can include components of the computing device 700.

As shown in FIG. 7, the computing device 700 includes a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to present visual information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include a wireless transceiver.

In some embodiments, the processor 702 can be embodied in a variety of forms. For example, the processor 702 can be embodied as various processing hardware-based means such as a microprocessor, a coprocessor, a controller or various other computing or processing devices including integrated circuits such as, for example, an application specific integrated circuit (ASIC), a field programmable gate array (FPGA), some combination thereof, or the like. Although illustrated as a single processor, it will be appreciated that the processor 702 can include two or more processors. The processors can be in operative communication with each other and can be collectively configured to perform one or more functionalities of the computing device 700 as described herein. In some embodiments, the processor 702 can be configured to execute instructions that can be stored in a Random-Access Memory (RAM) 720 or that can be otherwise accessible to the processor 702.

The computing device 700 also include a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

In some embodiments, a computing device configured to manage visual information on a client display includes a memory device that stores executable instructions for running applications on the client display. The computing device also includes a processor communicatively coupled to the memory device. The processor is configured to carry out steps that include: running, at a first refresh rate, a first application and a second application; receiving an instruction to select the first application; and causing, based on the instruction, the first application to run at a second refresh rate different than the first refresh rate.

In some embodiments, the processor is further configured to carry out the steps that include: instructing the client display to present the first application in accordance with the second refresh rate, and present the second application in accordance with the first refresh rate. In some embodiments, the second refresh rate is faster than the first refresh rate. In some embodiments, the processor is configured to carry out the steps that include, subsequent to receiving the instruction, receiving a second instruction to de-select the first application, and causing, based on the second instruction, the first application to run at the first refresh rate. In some embodiments, the processor is configured to carry out the steps that include representing the second application with an image file, and wherein the image file is updated in accordance with the first refresh rate. In some embodiments, the instruction comprises selecting from a group comprising one of: a selection of the first application using a cursor; hovering the cursor over the first application; and a selection of the first application using a keyboard. In some embodiments, the processor is configured to carry out the steps that include: receiving a data stream from i) a first target device monitored by the first application, and ii) a second target device monitored by the second application; and determining, based on the data stream, the first application is updating faster than the second application.

In some embodiments, a non-transitory computer readable storage medium is configured to store instructions that, when executed by a processor included in a computing device, cause the computing device to manage visual information on a client display, by carrying out steps that include: running, at a first refresh rate, a first application and a second application; receiving an instruction to select the first application; and causing, based on the instruction, the first application to run at a second refresh rate different than the first refresh rate.

In some embodiments, the processor is further configured to carry out the steps that include: instructing the client display to: present the first application in accordance with the second refresh rate, and present the second application in accordance with the first refresh rate. In some embodiments, the second refresh rate is faster than the first refresh rate. In some embodiments, the processor is configured to carry out the steps that include: subsequent to receiving the instruction, receiving a second instruction to de-select the first application; and causing, based on the second instruction, the first application to run at the first refresh rate. In some embodiments, the processor is configured to carry out the steps that include representing the second application with an image file, and wherein the image file is updated in accordance with the first refresh rate. In some embodiments, the instruction comprises selecting from a group comprising one of: a selection of the first application using a cursor; hovering the cursor over the first application; and a selection of the first application using a keyboard. In some embodiments, the processor is configured to carry out the steps that include: receiving a data stream from i) a first target device monitored by the first application, and ii) a second target device monitored by the second application; and determining, based on the data stream, the first application is updating faster than the second application.

In some embodiments, a method for managing visual information on a client display includes, by a computing device comprising a processor: running, at a first refresh rate, a first application and a second application; receiving an instruction to select the first application; and causing, based on the instruction, the first application to run at a second refresh rate different than the first refresh rate.

In some embodiments, the method also includes instructing the client display to: present the first application in accordance with the second refresh rate, and present the second application in accordance with the first refresh rate. In some embodiments, the second refresh rate is faster than the first refresh rate. In some embodiments, the method also includes, subsequent to receiving the instruction, receiving a second instruction to de-select the first application, and causing, based on the second instruction, the first application to run at the first refresh rate. In some embodiments, the instruction comprises selecting from a group comprising one of: a selection of the first application using a cursor; hovering the cursor over the first application; and a selection of the first application using a keyboard. In some embodiments, the method also includes: receiving a data stream from i) a first target device monitored by the first application, and ii) a second target device monitored by the second application; and determining, based on the data stream, the first application is updating faster than the second application.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A computing device configured to manage visual information on a client display, the computing device comprising:
   a memory device that stores executable instructions for running applications on the client display;
   a processor communicatively coupled to the memory device, the processor configured to carry out steps that include:
      running, at a first refresh rate, a first application and a second application, wherein the first application represents a first server device and the second application represents a second server device;
      in response to receiving an instruction to select the first application,
      causing, based on the instruction, the first application to run at a second refresh rate different than the first refresh rate;
      monitoring network bandwidth associated with the first server device and network bandwidth associated with the second server device; and
      in response to at least one of the network bandwidth associated with the first server device and the network bandwidth associated with the second device being less than a threshold bandwidth:
         identifying which of the first application and the second application is associated with the at least one of the network bandwidth associated with the first server device and the network bandwidth associated with the second device that is less than the threshold bandwidth; and
         changing a refresh rate of the identified one of the first application and the second application.

2. The computing device of claim 1, wherein the processor is further configured to carry out the steps that include:
instructing the client display to:
present the first application in accordance with the second refresh rate, and
present the second application in accordance with the first refresh rate.

3. The computing device of claim 2, wherein the second refresh rate is faster than the first refresh rate.

4. The computing device of claim 1, wherein the processor is configured to carry out the steps that include:
subsequent to receiving the instruction, receiving a second instruction to de-select the first application; and
causing, based on the second instruction, the first application to run at the first refresh rate.

5. The computing device of claim 1, wherein the processor is configured to carry out the steps that include representing the second application with an image file, and wherein the image file is updated in accordance with the first refresh rate.

6. The computing device of claim 1, wherein the instruction comprises selecting from a group comprising one of:
a selection of the first application using a cursor;
hovering the cursor over the first application; and
a selection of the first application using a keyboard.

7. The computing device of claim 1, wherein the processor is configured to carry out the steps that include:
receiving a data stream from i) a first target device monitored by the first application, and ii) a second target device monitored by the second application; and
determining, based on the data stream, the first application is updating faster than the second application.

8. A non-transitory computer readable storage medium configured to store instructions that, when executed by a processor included in a computing device, cause the computing device to manage visual information on a client display, by carrying out steps that include:
running, at a first refresh rate, a first application and a second application, wherein the first application represents a first server device and the second application represents a second server device;
in response to receiving an instruction to select the first application,
causing, based on the instruction, the first application to run at a second refresh rate different than the first refresh rate;
monitoring network bandwidth associated with the first server device and network bandwidth associated with the second server device; and
in response to at least one of the network bandwidth associated with the first server device and the network bandwidth associated with the second device being less than a threshold bandwidth:
identifying which of the first application and the second application is associated with the at least one of the network bandwidth associated with the first server device and the network bandwidth associated with the second device that is less than the threshold bandwidth; and
changing a refresh rate of the identified one of the first application and the second application.

9. The non-transitory computer readable storage medium of claim 8, wherein the processor is further configured to carry out the steps that include:
instructing the client display to:
present the first application in accordance with the second refresh rate, and
present the second application in accordance with the first refresh rate.

10. The non-transitory computer readable storage medium of claim 9, wherein the second refresh rate is faster than the first refresh rate.

11. The non-transitory computer readable storage medium of claim 8, wherein the processor is configured to carry out the steps that include:
subsequent to receiving the instruction, receiving a second instruction to de-select the first application; and
causing, based on the second instruction, the first application to run at the first refresh rate.

12. The non-transitory computer readable storage medium of claim 8, wherein the processor is configured to carry out the steps that include representing the second application with an image file, and wherein the image file is updated in accordance with the first refresh rate.

13. The non-transitory computer readable storage medium of claim 8, wherein the instruction comprises selecting from a group comprising one of:
a selection of the first application using a cursor;
hovering the cursor over the first application; and
a selection of the first application using a keyboard.

14. The non-transitory computer readable storage medium of claim 8, wherein the processor is configured to carry out the steps that include:
receiving a data stream from i) a first target device monitored by the first application, and ii) a second target device monitored by the second application; and
determining, based on the data stream, the first application is updating faster than the second application.

15. A method for managing visual information on a client display, the method comprising:
by a computing device comprising a processor:
running, at a first refresh rate, a first application and a second application, wherein the first application represents a first server device and the second application represents a second server device;
in response to receiving an instruction to select the first application,
causing, based on the instruction, the first application to run at a second refresh rate different than the first refresh rate,
monitoring network bandwidth associated with the first server device and network bandwidth associated with the second server device; and
in response to at least one of the network bandwidth associated with the first server device and the network bandwidth associated with the second device being less than a threshold bandwidth:
identifying which of the first application and the second application is associated with the at least one of the network bandwidth associated with the first server device and the network bandwidth associated with the second device that is less than the threshold bandwidth; and
changing a refresh rate of the identified one of the first application and the second application.

16. The method of claim 15, further comprising:
instructing the client display to:
present the first application in accordance with the second refresh rate, and
present the second application in accordance with the first refresh rate.

17. The method of claim 16, wherein the second refresh rate is faster than the first refresh rate.

18. The method of claim 15, further comprising:
subsequent to receiving the instruction, receiving a second instruction to de-select the first application; and
causing, based on the second instruction, the first application to run at the first refresh rate.

19. The method of claim 15, wherein the instruction comprises selecting from a group comprising one of:
a selection of the first application using a cursor;
hovering the cursor over the first application; and
a selection of the first application using a keyboard.

20. The method of claim 15, further comprising:
receiving a data stream from i) a first target device monitored by the first application, and ii) a second target device monitored by the second application; and
determining, based on the data stream, the first application is updating faster than the second application.

* * * * *